United States Patent

[11] 3,575,259

| [72] | Inventor | Philip W. Wilkinson<br>Kent, Wash. |
|---|---|---|
| [21] | Appl. No. | 27,275 |
| [22] | Filed | Apr. 10, 1970 |
| [45] | Patented | Apr. 20, 1971 |
| [73] | Assignee | The Boeing Company<br>Seattle, Wash. |

[54] RETRACTABLE NOISE SUPPRESSION SYSTEM
7 Claims, 6 Drawing Figs.

[52] U.S. Cl. .................................................. 181/35,
181/51, 137/15.1, 239/265.13, 239/265.17,
239/265.37

[51] Int. Cl. .................................................. F01n 1/14,
F01n 1/16, B64d 33/06

[50] Field of Search .......................................... 181/33,43,
51,35, 35.1, 33.21, 33.22, 33.221, 33.222;
239/127.3, 265.11, 265.13, 265.17,
265.33—265.41; 137/15.1, 15.2

[56] References Cited
UNITED STATES PATENTS

| 3,477,231 | 11/1969 | Paulson ........................ | 181/33(.22) |
| 3,481,427 | 12/1969 | Dobbs et al. .................. | 181/33(.21) |

FOREIGN PATENTS

| 921,127 | 3/1963 | Great Britain ................ | 239/127.3 |

*Primary Examiner*—Robert S. Ward, Jr.
*Attorneys*—Glenn Orlob and Bernard A. Donahue

ABSTRACT: An aircraft engine air inlet noise suppression foil means comprising a plurality of segmented acoustically treated foil members stowed in recesses along the wall of the inlet passageway during cruise flight. The foil members are movable to an operative position for takeoff and low speed flight where they collectively form a ringlike array which splits the inlet flow and increases the acoustically treated wetted surface area tending to reduce sound pressure levels. The preferred embodiment provides stowed positions in auxiliary intake passageways which are opened by a translating cowl section, and foil members which automatically rotate to conform to local streamlines of the changing flow pattern in the inlet.

PATENTED APR 20 1971 3,575,259

INVENTOR.
PHILIP W. WILKINSON

BY

Bernard A Donahue
ATTORNEY

RETRACTABLE NOISE SUPPRESSION SYSTEM

This invention relates to aircraft jet engine noise suppression; and more particularly, to apparatus for selectively increasing the acoustically treated wetted surface area in an inlet or exhaust passageway to thereby increase attenuation of sound pressure levels during low speed flight.

To maximize sound attenuation in engine passageways it has been a recent practice to line the walls and structural members with acoustically treated sound absorbing materials. Further sound reduction can, of course, be obtained by placing additional fixed and rigid members with acoustically treated surfaces in the flow path. However, such an expedient will obviously have series adverse effects on the aerodynamic efficiency of the passageway during high speed flight. Also, during low speed flight such additional fixed members can interfere with changing natural flow patterns in the inlet passageway, particularly during crosswind, or equivalent conditions, thereby causing a reduction in inlet efficiency which could result in loss of power or engine surge.

It is a primary object of this invention to provide in an aircraft jet engine a mechanism for noise attenuation during takeoff or low speed flight which does not adversely effect cruise performance.

It is a related object of this invention to provide means increasing the wetted area of acoustically treated surface in an engine passageway during low speed flight which can be moved to a stowed position during cruise.

A further object of this invention is to present a functioning system of thin aerodynamically clean and stable segmented foil members, collectively forming a ringlike array for sound attenuation in an engine inlet passageway, which are each individually free to pivotally align with changing aerodynamic streamlines thereby minimizing interference with natural flow patterns.

Another objective of this invention is to provide a system of the type described for an engine inlet which is compatible with constraints imposed by an auxiliary air intake passageway which draws air through the engine cowling during low speed flight.

The above objectives are each achieved in the preferred embodiment of this invention by means of a plurality of longitudinally aligned foil members having oppositely facing acoustically lined surfaces. The members are stowed within recesses along the walls of the engine inlet passageway during cruise flight, and are moved to an operative position within the inlet to split the flow during low speed flight, thereby increasing the wetted area of acoustic surface material available for sound attenuation. The means provided for holding and supporting the foil members include pivotal connections located forward of the center of aerodynamic pressure on the foils, thereby allowing the foil to pivot in a stable manner to automatically conform and align with streamlines established by the natural flow pattern in the inlet. Acoustically lined auxiliary air intake passageways are opened by means of a forwardly translating lip-section of the cowl structure, and the foils are conveniently stowed in recesses formed in downstream portions of these passageways.

DESCRIPTION OF THE PREFERRED EMBODIMENT

Figure 1:
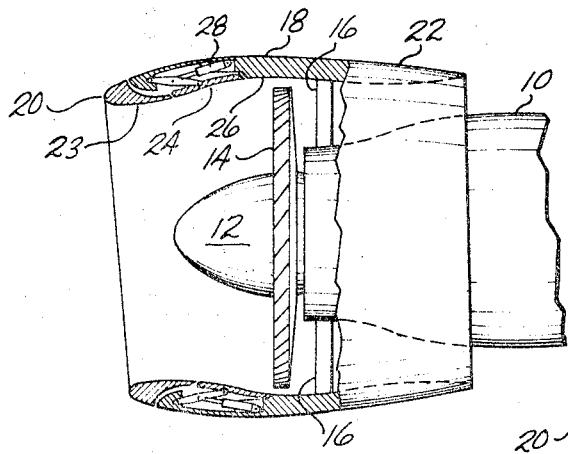
FIG. 1 is a cross-sectional view through the center of an aircraft turbofan jet engine incorporating Applicant's noise suppression system which is shown in the stowed or cruise flight position.

Referring now to FIG. 1, a typical turbofan engine installation 10 is shown to include an engine fan hub fairing 12, a fan member 14, cowling structural supports 16, and an outer cowling 18 which comprises entry lip portion 20 and aft cowl 22. The lip portion 20 includes an acoustically lined faired inlet surface 23. As will later become more apparent, a foil member 24 can be seen to provide a faired continuity between inlet surface 23 and an acoustically treated aft surface 26 of the interior cowling wall.

FIG. 1 illustrates Applicant's noise suppression system positioned for cruise or high speed flight. It should be noted that the shapes of the surfaces of outer cowling 18 are entirely conventional, with the cowling surfaces at 23, 24 and 26 providing an intake passageway outer wall for directing ambient air into the engine. The cowling surface shapes are designed for that function, and no penalty is incurred by inclusion of Applicant's noise suppression system within the recesses of the cowling structure.

Figure 2:
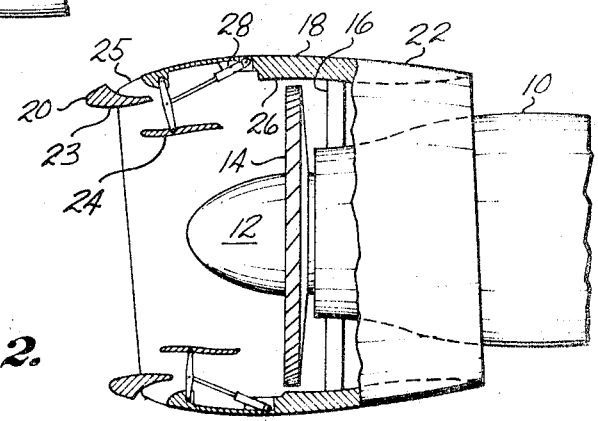
FIG. 2 is a cross-sectional view similar to FIG. 1 showing Applicant's system disposed in its operative position.

FIG. 2 shows the noise suppression system with foil member 24 deployed for sound attenuation. Note that an auxiliary air intake passageway 25 through cowling 18 has been opened by a forward translation of the lip portion 20 with respect to aft cowl 22. As is well known in this art, an auxiliary air intake passageway is often required during low speed flight to prevent engine starvation for lack of a sufficient volume of air passing through the primary inlet passageway, which is usually sized for minimum drag at cruise where ram effects allow smaller inlet areas. The method of opening the passageway here disclosed, viz., forward translation of the lip portion 20, offers a cleaner aerodynamic design than a conventional installation, and it inherently provides clearance for movement of Applicant's actuating means for positioning the foil members.

Figure 3:
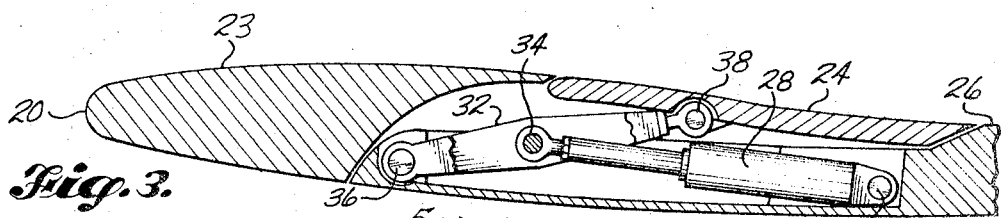
FIG. 3 is an enlarged detail cross section of the forward portion of the engine cowling showing one of Applicant's foil members stowed within the cowling.

FIG. 3 is an enlarged detail view showing Applicant's foil member 24 held in the stowed position for cruise flight. The foil member 24 comprises oppositely facing longitudinally extending exterior surfaces 27 and 29 which are acoustically treated for sound attenuation; for example, by attachment of any of the conventionally used porous coating materials. As positioned in FIG. 3, the inner exterior surface 27 provides a continuous fairing between inlet surface 23 and aft surface 26. It can be seen that in this stowed position, flow of inlet air over exterior surface 29 is prevented. The means for holding the foil in the stowed position includes an actuator 28, pivotally attached to the cowl at 30; a strut 32 attached to the actuator at 34, to the cowl 36, and attached to foil member 24 by a pivotal connection 38.

Figure 4:
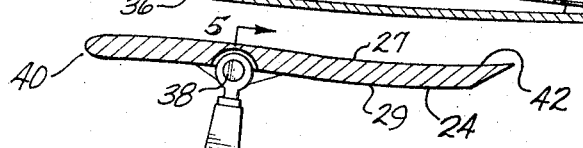
FIG. 4 is an enlarged detail cross section similar to FIG. 3 showing the foil member deployed in an operative position.

FIG. 4 shows the foil member 24 deployed in the noise suppression mode. Cowl portion 20 has been translated forwardly to open auxiliary air intake passageway 25, and actuator 28 is extended thereby moving strut 32 and pivotal connection 38 into position for holding the foil member 24 in its operative sound suppression mode. The pivotal connection 38 is located forward of the center of aerodynamic pressure acting on the foil member 24. As will readily be appreciated by persons skilled in this art, the foil member 24 is therefore aerodynamically stable and can effectively be floated or flown from its stowed to its operative position with a minimum of actuator force. The foil member 24 will automatically and continuously seek to align itself with changing aerodynamic streamlines within the passageway during transitory movement as well as while in its operative position. Because of this feature, the foil members are not a disruptive influence on changing inlet flow patterns, as when a crosswind or equivalent condition is encountered. Also, because of the pivotal connection 38, the foil takes up a zero lift position and therefore minimum loads are induced into the strut 32. The center of aerodynamic pressure of a thin foil such as foil member 24 will normally be located aft of a center between the forward portion 40 and the aft portion 42.

The foil member 24 is preferably an aerodynamically clean airfoil section of sandwich panel construction wherein the oppositely facing longitudinally extending exterior surfaces 27 and 29 are spaced apart no more than approximately 10 percent of the length of the foil member 24, in order to minimize section drag parameters. The foil member 24 may of course be aerodynamically tailored, mass balanced, and if desired trimmed as desired for stability and minimum drag. It is apparent that in the operative position, the total wetted area of acoustically treated surfaces over which the inlet air must flow has been markedly increased. The area of the outer exterior surface 29 of each of the foil members 24 has been added to the acoustically treated area of the passageway for the sound attenuation mode. Also, the auxiliary passageway 25 is equipped with additional acoustically lined and aerodynamically faired surfaces 44 and 46 which form a passageway for velocity and flow control of the auxiliary air.

Figure 5:
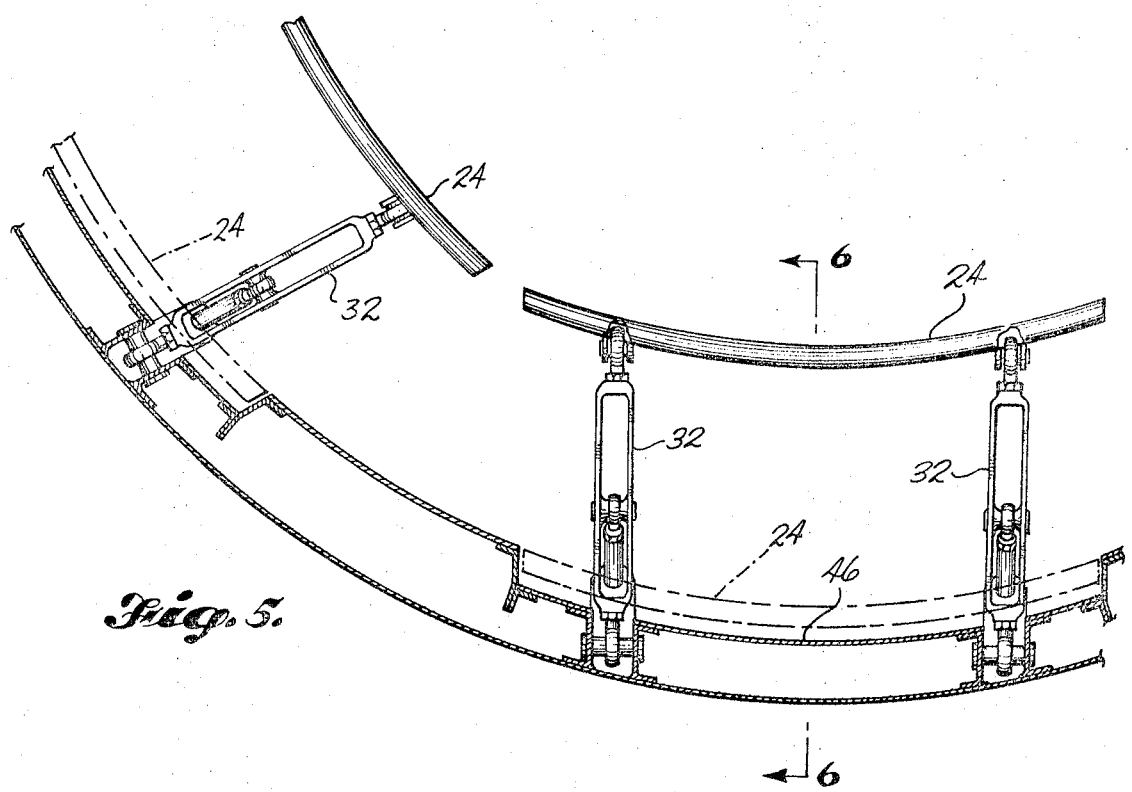
FIG. 5 is an enlarged sectional view taken at 5—5 in FIG. 4 showing details of construction of Applicant's segmented ringlike array of foil members.

FIG. 5 presents a section view taken at 5–5 in FIG. 2 showing foil member 24 supported by a pair of struts 32, of the type discussed previously. The overall curved configuration of the foil member 24, required to conform with the annular intake curvature of this embodiment, is apparent in this view. The foil member 24 is shown in full lines in its operative position and in phantom lines in the stowed position in the recess afforded by surface 46 of the auxiliary passageway.

Figure 6:
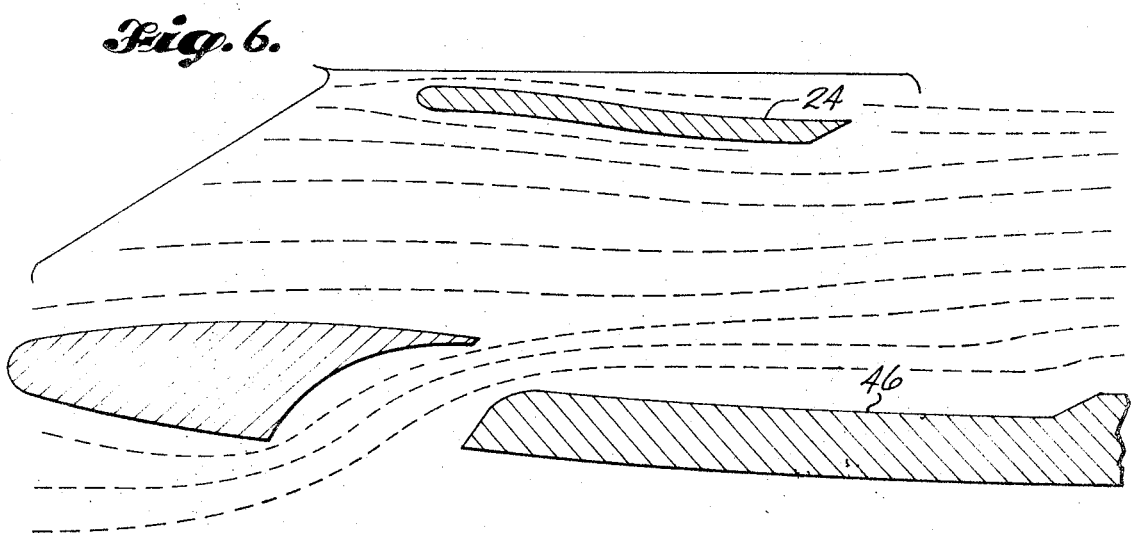
FIG. 6 is a section view taken at 6—6 in FIG. 5 through the center of a foil member to illustrate the aerodynamic cleanliness of Applicant's auxiliary air intake passageway and acoustic foil member combination.

FIG. 6 is intended to illustrate the overall aerodynamic cleanliness of the combined foil system and auxiliary intake passageway. For this reason the section was taken intermediate the strut members. As mentioned earlier, each of the surfaces over which flow occurs is acoustically treated, and the foil member 24 is free to pivot to assume a position conforming to streamlines established in the inlet. As sound attempts to propagate forwardly from the engine and fan out of the inlet, a large proportion will be attenuated by the cooperating acoustically lined surfaces of the foil member, the cowling wall, and the auxiliary intake passageway.

Based on the foregoing, it is apparent that Applicant's system provides a means for markedly increasing the wetted area of sound attenuating material in an intake passageway during low speed flight with no detrimental effect on cruise performance. Also, it will be noted that Applicant's system provides the increased wetted area without disrupting or distorting the natural flow patterns within the inlet.

While the primary utility of Applicant's noise suppression system will undoubtedly be realized for low speed, low altitude flight conditions, it should be recognized that the system is functional for high speed or high altitude noise suppression if a modest loss in propulsive efficiency is tolerable, as for example, in a special purpose military mission.

Many variations of the preferred embodiment shown will immediately be apparent to persons skilled in this art. The concepts disclosed are applicable to most contemporary aircraft engines, including those with other geometric sections, with modifications which do not depart from the spirit and scope of the invention. Therefore, it is intended in the appended claims to cover all such variations and modifications.

I claim:

1. In an aircraft jet engine having an air intake passageway defined by engine cowling structure which provides an outer wall for directing ambient air into said engine, a mechanism for attenuating sound pressure levels in said passageway comprising:
   a foil member having oppositely facing exterior surfaces which are acoustically treated,
   means for holding said member in a stowed position to thereby prevent flow of said air over at least one of said oppositely facing exterior surfaces,
   means for moving said foil member from said stowed position to an operative position spaced apart from said wall,
   means for holding said foil member in an operative position located such that flow of said air is split into an outer portion flowing between said foil member and said wall and an inner portion physically separated from said outer portion by said foil member.
wherein by movement of said foil member from said stowed position into said operative position the wetted area of acoustically treated surface over which said air will flow is increased to thereby increase the attenuation of sound pressure levels in said intake passageway.

2. The mechanism of claim 1 wherein said foil member comprises a thin aerodynamically clean airfoil section and the foil member exterior surfaces are spaced apart no more than approximately 10 percent of the length of the foil member.

3. The mechanism of claim 1 wherein said means for holding said foil member in said operative position comprises a pivotal connection located forward of the center of aerodynamic pressure which will allow said foil member to pivot to automatically conformably align with the flow pattern established in said intake passageway in response to aerodynamic pressures acting on said exterior surfaces.

4. The mechanism of claim 1 wherein said intake is an annular passageway for a turbofan engine and said mechanism comprises a plurality of said foil members which collectively form a ringlike array when disposed in said operative position.

5. The mechanism of claim 1 wherein said foil members are arranged such that in said stowed position they fit into a recess in said walls and an appropriate one of said exterior surfaces provides a fairing over said recess for aerodynamic continuity between the wall portion forward of said recess and the wall portion aft of said recess.

6. The mechanism of claim 1 wherein said engine cowling structure comprises an inlet lip portion which is translatable forwardly to open an auxiliary air intake passageway through said cowling structure and wherein said foil member is held in said stowed position within an aft extension of said auxiliary air intake passageway.

7. The mechanism of claim 6 which said means for holding said foil member in an operative position comprises an actuator and a strut member; said actuator being pivotally attached to said cowling structure and said strut.